3,365,436
PROCESS FOR THE POLYMERIZATION OF OLEFINS
Janine Ourgaud, Paris, France, assignor to Societe Nationale des Petroles d'Aquitaine, Paris, France
No Drawing. Filed Feb. 18, 1964, Ser. No. 345,559
Claims priority, application France, Feb. 18, 1963, 925,156
5 Claims. (Cl. 260—93.7)

The present invention relates to the polymerization of various olefins and/or diolefins, and particularly those containing 2 to 6 carbon atoms per molecule; it relates especially to the manufacture of solid polymers.

It is known to produce solid polymers from different olefins, and particularly from ethylene and from propylene, by polymerization in the presence of an inert liquid, solvent or diluent, with the aid of an appropriate metallic compound as catalyst, at temperatures between the ambient and 230° C., under various pressures but generally between 7 and 80 kg./cm.$^2$. German patent application No. 874,215 of Dec. 18, 1943 describes the manufacture of solid polyethylene in a liquid paraffin in the presence of anhydrous aluminum chloride and a powdered reducing metal such as aluminum; the polymerization takes place at temperatures between 130° C. and 180° C. and pressures of 30 to 80 kg./cm.$^2$. As was foreseen, this process is equally useful in the preparation of polyolefins, especially of polypropylene. However, high yield of polyolefins of very high molecular weight are hardly obtainable by means of this process as such.

In another process, which is described in French patent specification No. 1,110,260 applied for on Jan. 26, 1954, the activated catalyst to be used—always in the presence of a liquid paraffinic hydrocarbon as diluent—consists of chromium or nickel oxide on a silico-aluminous support; the process is carried out at temperatures between 38° and 230° C., preferably between 65° and 190° C., under pressures above 7 kg./cm.$^2$. Although this process produces crystalline polyethylene and polypropylene, it does not give polymers of very high molecular weight, for example above 100,000.

It is also known, from French Patents Nos. 1,123,617 of Jan. 12, 1955 and 1,138,290 of June 6, 1955 to polymerize olefins in the presence of an organo-metallic, especially organo-aluminum, compound admixed with titanium chloride; this process allows polymers of very high molecular weight to be obtained, but it necessitates the use of an expensive catalyst which is rather difficult to handle. The organo-metallic catalyst must be used in quite large amounts, and the production costs are thereby notably increased.

The present invention seeks to overcome the disadvantages described in the known processes, and to enable solid polyolefins of molecular weight as high as is desired to be manufactured under easy economic and technological conditions.

The process according to the invention comprises polymerizing one or more olefins in the presence of a Friedel-Crafts catalyst together with a reducing metal, the process being carried out in two stages: (1) prepolymerization in contact with catalyst alone or mixed with a little amount of inert liquid, and (2) final polymerization after the addition of the inert liquid or the remaining portion thereof to the prepolymerization product.

As known, Friedel-Crafts catalysts are halides of metals or of boron, having acidic character, and particularly aluminum, titanium or boron halides, especially $AlCl_3$, $TiCl_3$ and $BF_4$.

The invention makes use of the discovery that it is preferable to use, at the commencement of the process, a minor fraction only of the amount of inert liquid required as reaction medium in the prior processes.

In a particularly preferred method of carrying out the invention, the catalyst is that of the previously mentioned German Patent No. 847,215, i.e. it is a mixture of anhydrous aluminum trichloride with powdered aluminum and titanium trichloride. Titanium tetrachloride may alternatively be used in place of the trichloride if an additional amount of powdered aluminum is added sufficient to reduce the titanium tetrachloride to the trichloride. The respective proportions of the three components of the catalyst can be varied between fairly wide limits, but it is preferred that the aluminum trichloride and aluminum metal should contain together 1.5 to 2 atoms of chlorine per atom of aluminum. The amount of titanium trichloride, is in the range from 0.1 to 1 mole per mole of aluminum trichloride, and preferably from 0.25 to 0.4 mole.

The inert liquid used can be chosen from those known in the prior art, especially hydrocarbons such as hexane, heptane, octane or iso-octane, liquid polyethylene or cyclanic or aromatic hydrocarbons.

The first stage of the process, i.e. the prepolymerization, is carried out in the presence of the catalytic mixture alone or with an addition of a small proportion of the inert liquid, just sufficient to put the catalyst in the form of a manipulable mixture; the liquid can be used for example in an amount of from 1 to 10 times the weight of the catalyst. The remainder of the liquid, or the entire amount, that is about 10 to 100 times the weight of the catalyst, is added at the end of the prepolymerization.

The process can be carried out at temperatures between 50° and 180° C., under pressures between 7 and 80 kg./cm.$^2$, but it is preferred to carry out the prepolymerization at a temperature above that of the rest of the polymerization. Thus the prepolymerization is preferably carried out between 120° and 170° C., under a pressure of 40 to 80 kg./cm.$^2$; after the addition of the remainder necessary amount of the inert liquid, it is preferred to continue the polymerization at a temperature between 70° and 120° C. and a pressure between 20 and 40 kg./cm.$^2$.

The prepolymerization can be considered as terminated when the weight of product formed amounts to 2 to 10 times that of the catalyst, and this point is generally reached after 2 to 7 hours, according to the temperature and pressure used.

The two stages of the polymerization can be carried out in practice either in the same reaction vessel such as an autoclave, or in two such vessels in series.

When a single vessel is used, the catalyst, with if desired a little of the inert liquid, is introduced into the autoclave, and the olefin to be polymerized is then passed in under pressure, and the mixture is heated for the predetermined time. If the olefin has a relatively low vapour pressure, the process can be carried out under a pressure corresponding to this vapour pressure or to that of the inert liquid used; on the other hand, in the case of ethylene or propylene, the pressure is maintained at the values indicated above. The remainder of the inert liquid is then introduced into the autoclave at the end of the prepolymerization, and the reactants are maintained at the new pressure and (generally lower) temperatures as indicated above.

When two autoclaves are used in series, the first autoclave is used only for the prepolymerization, and the product obtained therein is transferred in portions or continuously, as desired, into a second autoclave together with the remainder of the inner liquid, and the final polymerization is carried out therein.

According to a preferred embodiment of the process, the prepolymerization can be carried out in the presence of the mixture of aluminum trichloride and powdered aluminum alone, while the titanium chloride is added at the same time as the inert liquid, at the end of the prepolymerization.

The process is preferably carried out in a reaction vessel free from oxygen, and the vessel may therefore be flushed with hydrogen initially.

The invention will be illustrated by means of the following non-limitative examples.

*Example 1*

18.6 g. of anhydrous aluminum trichloride and 2.9 g. of powdered aluminum, well mixed together, were introduced into an autoclave. Propylene was introduced into the autoclave under a pressure of 74 kg./cm.$^2$ and was then heated progressively from 135° to 170° C. over a period of six hours with agitation, while the pressure was maintained at about the above value. The prepolymerization being terminated, 1,000 ml. of hexane and 6.2 g. of titanium trichloride were introduced into the autoclave in which the propylene inlet measure was maintained at 20 kg./cm.$^2$ at the temperature of 79° C. After eight hours, the pressure was released and the contents of the autoclave were worked up in known manner. 272 g. of crystalline polypropylene were thus obtained having a molecular weight of about 110,000.

*Example 2*

The process of Example 1 was repeated using ethylene instead of propylene; the prepolymerization was stopped after 4½ hours and the duration of the final polymerization was 6 hours; polyethylene having a molecular weight of about 100,000 has been thus obtained.

*Example 3*

The process of Example 1 was repeated, but the titanium chloride was added from the beginning, in the prepolymerization autoclave, with 30 ml. of heptane. The prepolymerization was carried out at a pressure of 50 kg./cm.$^2$, while the final polymerization took place at 22 kg./cm.$^2$, at 82° C., over a period of 7 hours. The molecular weight of the polypropylene obtained was about 90,000.

*Example 4*

The process of Example 1 was repeated; the prepolymerization was carried out in the presence of 20 g. of anhydrous aluminum trichloride, 3.4 g. of powdered aluminum and 5 g. of titanium trichloride mixed with 140 ml. of iso-octane, at 145° C. and a pressure of 48 kg./cm.$^2$. The final polymerization took place at 116° C., in 900 ml. of iso-octane, under a propylene pressure of 27 kg./cm.$^2$ for a period of 7 hours. The polypropylene obtained showed a molecular weight of about 60,000.

*Example 5*

The method of Example 4 was applied to a mixture of 89 parts of propylene and 11 parts of ethylene. A copolymer having approximately a molecular weight of about 54,000 has been obtained.

I claim:

1. A method for the polymerization of olefins in an inert liquid by contacting an olefin with a catalyst comprising halides of aluminum and titanium and powdered aluminum, which consists in: first heating the catalyst with a fraction of the total amount of the olefin, at 50° to 180° C. under 7 to 80 kg./cm.$^2$ of pressure, while no more than a minor fraction of the total amount of inert liquid required is admixed with the catalyst, until a weight of polymer equal to about 2 to 10 times that of the catalyst used is formed; then adding the remainder of the required amount of the inert liquid to the mixture of catalyst and polymer thus obtained, adding further portions of olefin, heating at 50° to 180° C. under a pressure of 7 to 80 kg./cm.$^2$, until the required amount of polymer is formed; and separate the obtained polymer from the inert liquid and from the catalyst.

2. A method for the polymerization of olefins in an inert solvent by contacting the olefins with a catalyst composed of aluminum chloride, titanium chloride and powdered aluminum, which consists in: first heating the catalyst with an olefin selected from the group consisting of ethylene and propylene, at 50° to 180° C. under a pressure of 7 to 80 kg./cm.$^2$, while no more than an amount of 10 times the weight of the catalyst of an inert conventional solvent of polyethylene and polypropylene is admixed with the catalyst, until a weight of polymer equal to about 2 to 10 times that of the catalyst used is formed; then adding to said polymer an amout of said solvent of 10 to 100 times the weight of the catalyst; heating the mixture thus obtained at 50° to 180° C. under a pressure of 7 to 80 kg./cm.$^2$ until the required amount of polymer is formed; and separate the obtained polymer from the inert solvent and from the catalyst.

3. A method for the polymerization of olefins in an inert solvent by contacting the olefins with a catalyst composed of aluminum chloride, titanium chloride and powdered aluminum, which consists in: first heating the catalyst with an olefin selected from the group consisting of ethylene and propylene, at 50° to 180° C. under a pressure of 7 to 80 kg./cm.$^2$, while no more than an amount of 10 times the weight of the catalyst of an hydrocarbon selected from the group consisting of hexane, heptane, octane, iso-octane and liquid polyethylene is admixed with the catalyst, until a weight of polymer equal to about 2 to 10 times that of the catalyst used is formed; then adding to said polymer an amount of said hydrocarbon of 10 to 100 times the weight of the catalyst; heating the mixture thus obtained at 50° C. to 180° C. under a pressure of 7 to 80 kg./cm.$^2$ until the required amount of polymer is formed; and separating the obtained polymer from the hydrocarbon and from the catalyst.

4. A method for the polymerization of olefins in an inert solvent by contacting the olefins with a catalyst composed of aluminum chloride, titanium chloride and powdered aluminum, which consists in: first heating the catalyst with an olefin selected from the group consisting of ethylene and propylene, at 120° to 170° C. under a pressure of 40 to 80 kg./cm.$^2$, while no more than an amount of 10 times the weight of the catalyst of an hydrocarbon selected from the group consisting of hexane, heptane, octane, iso-octane and liquid polyethylene is admixed with the catalyst, until a weight of polymer equal to about 2 to 10 times that of the catalyst used is formed; then adding to said polymer an amount of said hydrocarbon of 10 to 100 times the weight of the catalyst; heating the mixture thus obtained at 70° to 120° C. under a pressure of 20 to 40 kg./cm.$^2$ until the required amount of polymer is formed; and separating the obtained polymer from the hydrocarbon and from the catalyst.

5. A method for the polymerization of olefins in a liquid inert hydrocarbon by contacting the olefins with a catalyst composed of aluminum chloride, titanium chloride and powdered aluminum, which consists in; first heating a mixture of anhydrous aluminum chloride and aluminum powder, in which mixture there are 1.5 to 2 combined chlorine atoms per aluminum atom, with an olefin selected from the group consisting of ethylene and propylene at 120° to 170° C. under a pressure of 40 to 80 kg./cm.$^2$, after said mixture has been added with 1 to 10 times its weight of an hydrocarbon selected from the group consisting of hexane, heptane, octane, iso-octane and liquid polyethylene, the heating being continued until a weight of polymer equal to about 2 to 10 times the weight of said mixture is formed; then adding to said polymer and said mixture an amount of said hydrocarbon equal to 10 to 100 times the weight of said mixture and an amount of titanium chloride selected from the group consisting of titanium trichloride and titanium tetrachloride such that there is 0.1 to 1 mole of it per mole of the aluminum trichloride used; heating the mixture thus obtained at 70° to 120° C. under a pressure of 20 to 40 kg./cm.$^2$ until the required amount of polymer is formed; and separating the obtained polymer from the hydrocarbon and from the aluminum, titanium and chlorine compounds it contains.

References Cited

UNITED STATES PATENTS

| | | | |
|---|---|---|---|
| 2,936,302 | 5/1960 | Jones et al. | 260—94.9 |
| 2,996,459 | 8/1961 | Andersen et al. | 260—94.9 |
| 3,093,625 | 6/1963 | Friederich et al. | 260—94.9 |
| 3,074,922 | 1/1963 | Dye et al. | 260—94.9 |

JOSEPH L. SCHOFER, *Primary Examiner.*

L. EDELMAN, *Assistant Examiner.*